United States Patent
Michel et al.

[11] Patent Number: 6,147,979
[45] Date of Patent: Nov. 14, 2000

[54] SYSTEM AND METHOD FOR ECHO CANCELLATION IN A COMMUNICATION SYSTEM

[75] Inventors: Alan D. Michel, Fishers; David L. Rowley, Indianapolis, Marion County, both of Ind.

[73] Assignee: Lucent Technologies, Inc., Murray Hill, N.J.

[21] Appl. No.: 08/909,893

[22] Filed: Aug. 12, 1997

[51] Int. Cl.[7] ...................................................... H04B 3/23
[52] U.S. Cl. ........................... 370/292; 370/286; 379/410
[58] Field of Search ................................... 370/286, 287, 370/288, 289, 290, 291, 292, 201; 379/410, 411, 406, 402; 375/285, 254

[56] References Cited

U.S. PATENT DOCUMENTS

| | | | |
|---|---|---|---|
| 4,811,342 | 3/1989 | Huang ..................................... | 370/32.1 |
| 5,305,307 | 4/1994 | Chu ........................................ | 370/32.1 |
| 5,598,468 | 1/1997 | Ammicht et al. ....................... | 379/410 |
| 5,633,863 | 5/1997 | Gysel et al. ............................ | 370/290 |
| 5,859,872 | 1/1999 | Townsend ............................... | 375/285 |
| 5,896,452 | 4/1999 | Yip et al. ................................ | 379/410 |

OTHER PUBLICATIONS

Dennis R. Morgan and James C. Thi, A Delayless Subband Adaptive Filter Architecture, Aug., 1995, IEEE Transactions on Signal Processing, vol. 43, No. 8.

*Primary Examiner*—Huy D. Vu
*Attorney, Agent, or Firm*—Wildman, Harrold, Allen & Dixon

[57] ABSTRACT

A system and method for echo cancellation in a communication system having a digital echo canceller and an analog echo canceller for analog reduction of cross coupling echo components in an analog output signal when in analog form before digital processing by the digital echo canceller. An analog cancellation signal is generated which is substantially the same as the acoustic coupling echo component in the analog output signal before digital processing by the digital echo canceller. The analog echo cancellation signal is combined with the analog output signal to reduce the cross coupling echo component before digital processing by the digital echo canceller.

31 Claims, 8 Drawing Sheets

SYSTEM AND METHOD FOR ECHO CANCELLATION IN A COMMUNICATION SYSTEM

BACKGROUND OF THE INVENTION

1. Field of the Invention

This invention relates generally to echo cancellers and, more particularly, to echo cancellers and echo cancelling methods for reducing cross coupling echoes in communication systems.

2. Description of the Related Art

Figure 1:
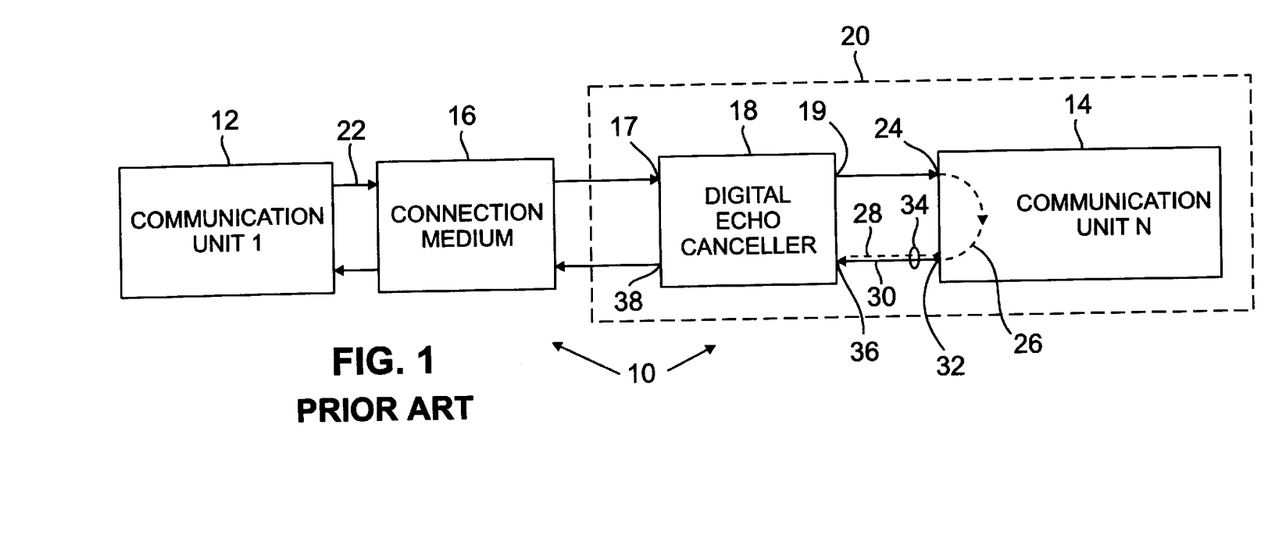
FIG. 1 is a functional block diagram of a PRIOR ART digital echo canceller employed in a communication system to reduce cross coupling echo components.

Echo cancellers used in communication systems to reduce echoes caused by cross coupling of an incoming received signal received at a communication unit with an outgoing analog output signal are well known. Referring to FIG. 1, a PRIOR ART communication system 10 is seen to have a plurality of communication units, such as communication units 12 and 14, which are interconnected via a connection medium 16, such as a telephonic switching system or airwave transceiver.

Associated with each of the communication units, such as shown with respect to communication unit 14, is a digital echo canceller 18 contained within a common housing 20 together with the associated communication unit 14.

An incoming signal from output 22 of communication unit 12 passes through the connection medium 16 and an input 17 and output 19 of digital echo canceller 18 and is received at an input terminal 24 of communication unit 14. The incoming received signal at input terminal 24 is cross coupled via a cross coupling path 26 and creates a cross coupling echo component 28 combined with an originating signal 30 originating from or passing through the communication unit 14 to form a composite analog output signal 34 produced on output terminal 32. The composite signal 34 produced on output terminal 32, composed of the originating analog output signal 30 and the analog cross coupling echo component 28, is applied to an input terminal 36 of the digital echo canceller 18. The digital echo canceller converts the analog signal 34 to digital form and reduces the cross coupling echo component 28 before passing the echo reduced composite signal to its output 38.

Figure 2:
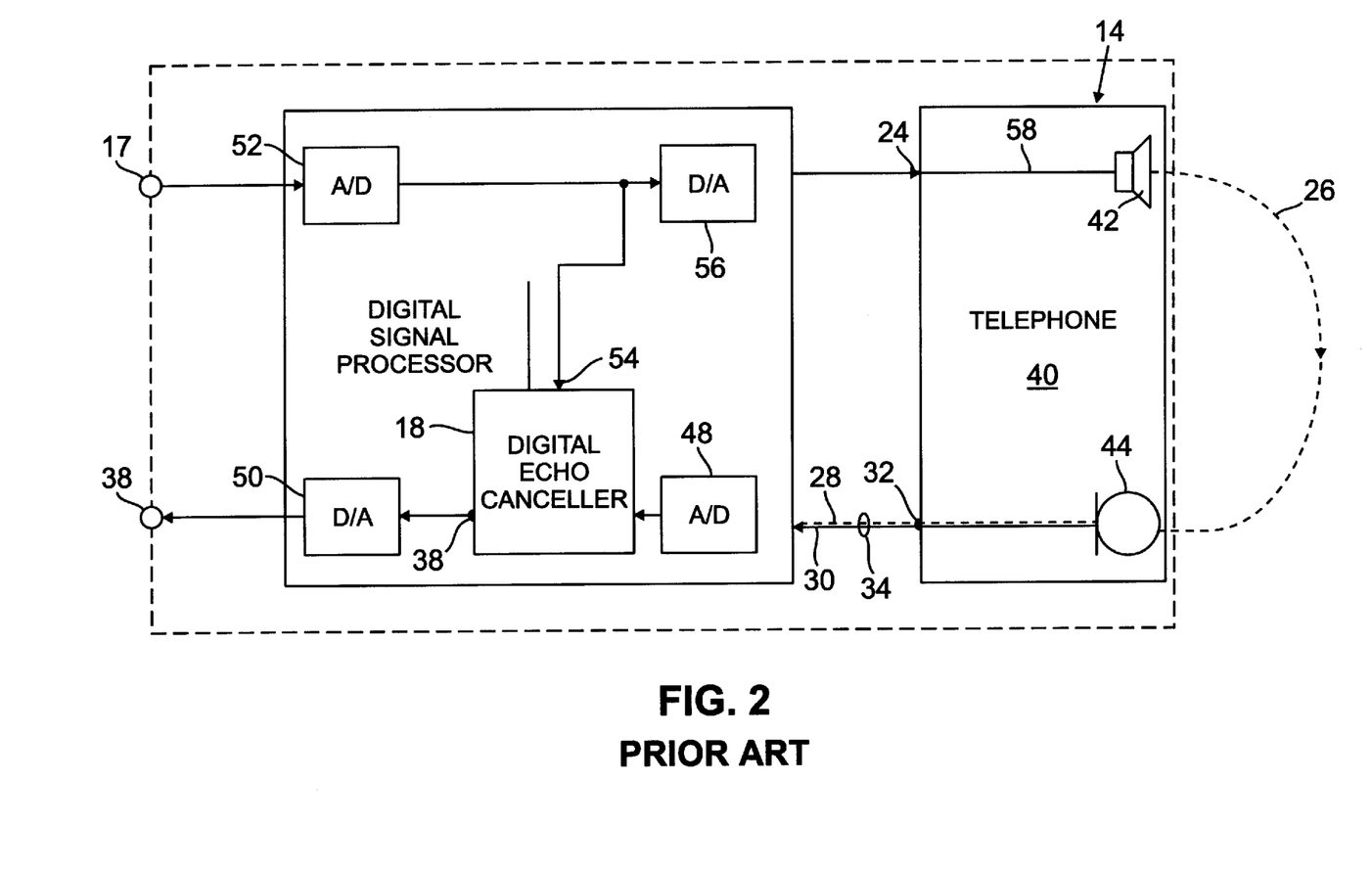

Referring to FIG. 2, in the case of the communication unit 14 being a telephonic unit 40 (e.g. a regular telephone, a telephonic handset, a speaker telephone or stand alone speaker-microphone set, a cordless telephone or a cellular telephone or full duplex two-way radio) with a speaker 42 and a microphone 44, the cross coupling path 26 is an acoustic path for sound waves passing from the speaker 42 to the microphone 44. The echo component 28 results from the sound from the speaker 42 being picked up by the microphone 44. The originating signal is obtained from the local sounds, such as a person's voice, which is picked up by the microphone 44 and converted to the originating analog output signal 30. In such case, the digital echo canceller 18 is incorporated into and forms part of a digital signal processor 46, such as a DSP 1604 digital signal processor made by the Microelectronics Division of Lucent Technologies Inc. The composite analog output signal 34 is converted to digital form by an analog-to-digital, or A/D, converter 48 and the echo reduced digital signal on output 38 of the digital echo canceller 18 is then reconverted to analog form by a D/A converter 50. The D/A converters are "codecs", model number T7525.

Likewise, the analog signal at input 17 coming from the communication unit 12 is converted to digital form by an A/D converter 52 before being applied to an input 54 of the digital echo canceller 18. The received signal from A/D converter 52 is then reconverted to analog form by a D/A converter 56 to provide the analog received signal to input 24 of communication unit 14, in this case an input 58 of speaker 42 of telephone 40. The digital echo canceller 18 functions to combine the digital sample of the received signal at input 54 with the digital form of the composite analog output signal 34 appearing at the output of A/D converter 48 to cancel the corresponding digital form of the analog echo component 28 which has also been converted to digital form by A/D converter 48.

Figure 3:
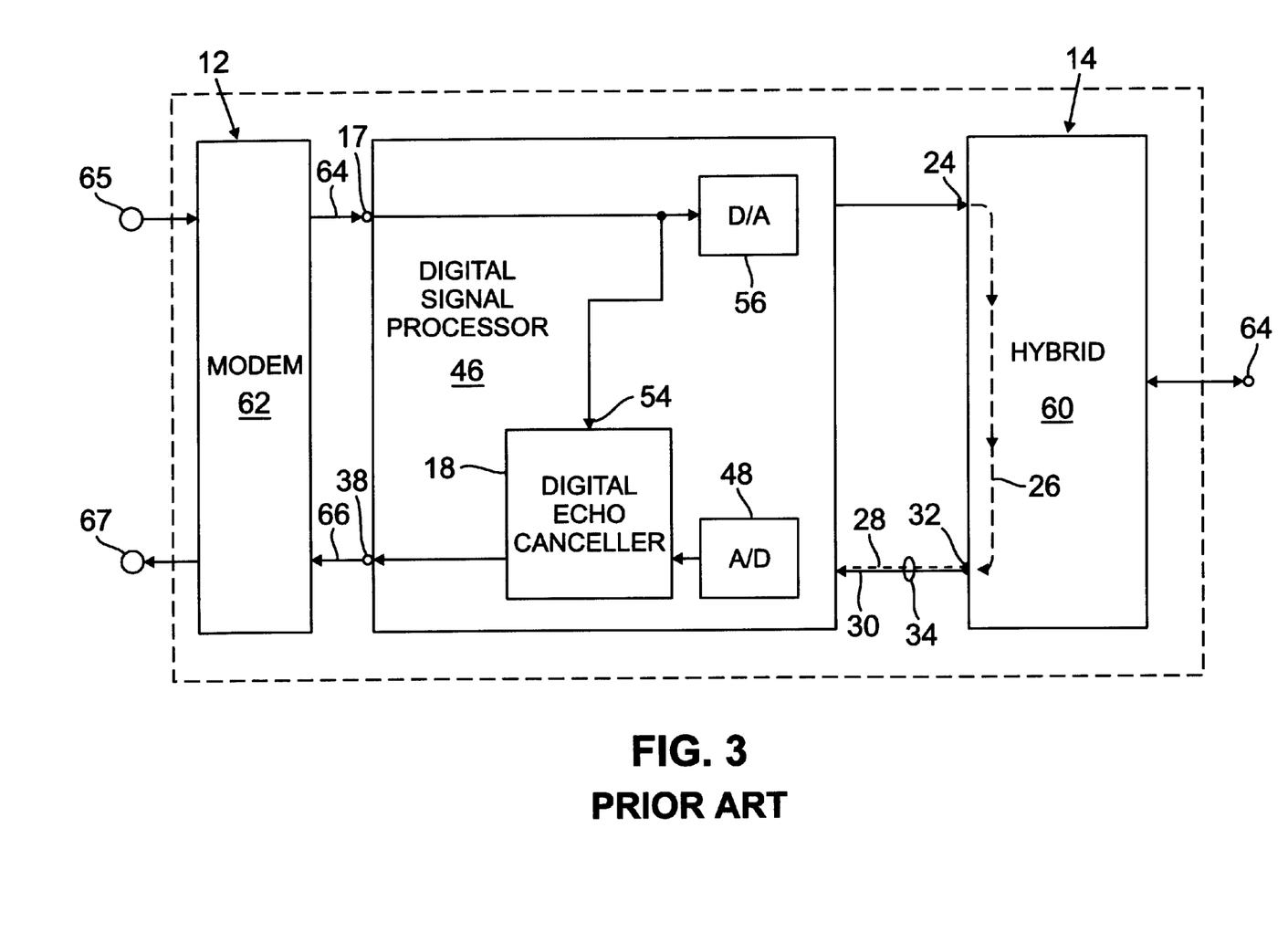
FIG. 3 is a functional block diagram of the PRIOR ART digital echo canceller block of FIG. 1 as used to reduce cross coupling echoes in a system in which the communication unit is a telephonic hybrid associated with a modem.

Referring now to FIG. 3, in the case of the communication unit 14 being a telephonic hybrid interface circuit, or hybrid, 60 and the communication unit 12 being a modem 62, the same digital signal processor 46, with digital echo canceller 18, D/A converter 56 and A/D converter 48 are employed. However, since the modem 62 is equipped both to transmit digital signals on its output 64 connected to input terminal 17 and to receive digital signals at its input 66 connected with terminal 38, the A/D converter 52 and the D/A converter 50 are eliminated.

The modem 62 also has an input terminal 65 and an output terminal 67 connected with a computer, facsimile machine or other like digital data communication equipment. The input 24 of the communication unit 14, in this case hybrid 60, is a two wire line carrying the incoming received signal from modem 62 in analog form, and the output terminal 32 is a two wire line carrying the composite analog output signal 34. The composite signal 34 is composed of the cross coupling echo component received via the cross coupling path 26 from the input 24 and the originating audio modulated data signal 30 obtained from a hybrid line terminal 64 which, in turn, is connected via a telephonic switching system or the like to a remote modem (not shown).

These known digital echo cancellers require highly accurate analog-to-digital and digital-to-analog conversion to achieve a high degree of echo cancellation. An example of an echo canceller using only digital processing is shown in U.S. Pat. No. 5,598,468 issued Jan. 28, 1997 to Ammicht et al. for "Method and Apparatus for Echo Removal in a Communication System". At high speeds above 50-KBPS, signal converters are expensive as also are the high speed processors needed for digital echo cancellation. Accordingly, it is also known to provide high speed echo cancellation using only analog technology without the use of digital-to-analog or analog-to-digital conversion. An example of such an analog system is shown in U.S. Pat. No. 4,811,342 issued Mar. 7, 1989 to Huang for "High Speed Analog Echo Canceller".

While these prior digital echo cancellers and prior analog echo cancellers function to achieve their purpose in reducing echoes, complete echo removal is not achieved.

SUMMARY OF THE INVENTION

It is therefore an aspect of the present invention to provide an echo canceller and echo cancelling method for reducing an echo component in an analog output signal caused by cross coupling of an incoming received signal received at a communication unit with the analog output signal which provides improved echo removal by using both digital and analog echo cancellation techniques in a single echo canceller while reducing digitization degradation present in known digital echo cancellers due to the presence of echo components in the analog domain noted above.

In the case of a telephone unit or the like, such as shown in FIG. 2, the cross coupled echo signal strength from the speaker to the microphone is often ten to fifteen decibels above that of the originating signal due to the local person speaking. The voice of the local person speaking is therefore digitized with fewer bits than if the speaker to microphone acoustic coupling echo component were reduced. Because the entire signal including the cross coupling component must be digitized, some of the bits available for conversion are used to digitize the echo component. Likewise, in modems or the like with hybrids, such as shown in FIG. 3, it has been determined that the originating signal is digitized with less than the maximum number of bits available due to some of the bits being needed to digitize the cross coupling echo component which causes decreased modem performance.

In accordance with the present invention, these problems are overcome and echo cancellation improved by employing both digital and analog techniques to obtain optimum echo cancellation and improved digitization resolution of the originating signals to be transmitted. The cross coupling echo component is reduced by analog techniques prior to digital cancellation.

The invention is achieved in part by provision of an echo canceller for reducing an echo component in an analog output signal caused by cross coupling of an incoming received signal received at a communication unit with the outgoing analog output signal, comprising a digital echo canceller for digitally processing the analog output signal after being converted to digital form to reduce the cross coupling echo component before transmission from the communication unit and an analog echo canceller connected between the communication unit output and the digital echo canceller for analog reduction of the cross coupling echo component in the analog output signal when in analog form before digital processing by the digital echo canceller.

The analog echo canceller includes means for generating an analog cancellation signal which is substantially the same as the acoustic coupling echo component in the analog output signal before digital processing by the digital echo canceller and means for combining the analog echo cancellation signal with the analog output signal to reduce the cross coupling echo component before digital processing by the digital echo canceller. The combining means produces an echo reduced analog output signal and includes means interposed between the combining means and the digital echo canceller to automatically amplify the echo reduced analog output signal to a level for substantially maximum resolution digitization of the echo reduced analog output signal. The automatically amplifying means includes a variable gain amplifier, means for setting the amplifier gain at a level below a digitization saturation level, means for training the analog echo canceller until maximum echo reduction is achieved and means for increasing the gain of the variable gain amplifier after training is completed to obtain maximum digital resolution during conversion. The gain increasing means includes means for monitoring the maximum magnitude of the echo reduced analog output signal relative to a peak conversion level and means for automatically adjusting the gain to maintain a preselected rate of repetitive conversions substantially at the peak conversion level.

In the case of the communication unit being a telephone having a speaker for producing sounds corresponding to the incoming received signal and a microphone for converting sounds to the analog output signal, the analog output signal is a microphonic analog output signal for transmission to a remote telephone, the microphone is acoustically coupled with the speaker resulting in production of said echo component and the echo component is an acoustic coupling echo component in the microphonic analog output signal.

In the case of the communication unit being a telephonic hybrid associated with a modem, the hybrid circuit interfaces the incoming received signal received from the modem at a hybrid input terminal to a single pair telephone line and interfaces the analog output signal received on the single pair telephone line through a hybrid output terminal to the modem, and the hybrid circuit has components which cross couple the signals at the hybrid input terminal to the hybrid output terminal which cause the echo components in the analog output signal at the hybrid output terminal.

In accordance with another aspect of the invention an echo cancelling method is provided for reducing an echo component in an analog output signal at a communication unit caused by cross coupling of an incoming received signal at the communication unit with the analog output signal, comprising the steps of (a) reducing with an analog echo canceller the cross coupling echo component in the analog output signal to produce an echo reduced analog output signal and (b) digitally processing the echo reduced analog output signal to reduce the acoustic coupling echo component before transmission.

In an embodiment of the invention, the step of reducing with an analog echo canceller includes the steps of (a) generating an analog cancellation signal which is substantially the same as the cross coupling echo component in the analog output signal before digital processing by the digital echo canceller and (b) combining the analog echo cancellation signal with the analog output signal to reduce the acoustic coupling echo component before digital processing by the digital echo canceller.

The incoming received signal is cross coupled with the analog output signal via a coupling path having a scaled impulse response, and the step of digital processing includes the step of processing the digital received signal with the scaled impulse response of the cross coupling path. The analog cancellation signal is coupled to the combining means via a feedback path having a scaled impulse response, and the step of digital processing includes the step of processing the digital received signal with the scaled impulse response of the feedback path.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 2 is a functional block diagram of the PRIOR ART digital echo canceller block of FIG. 1 as used to reduce acoustic cross coupling echoes in a communication system in which the communication unit is a telephone or the like;

DETAILED DESCRIPTION

Figure 4:
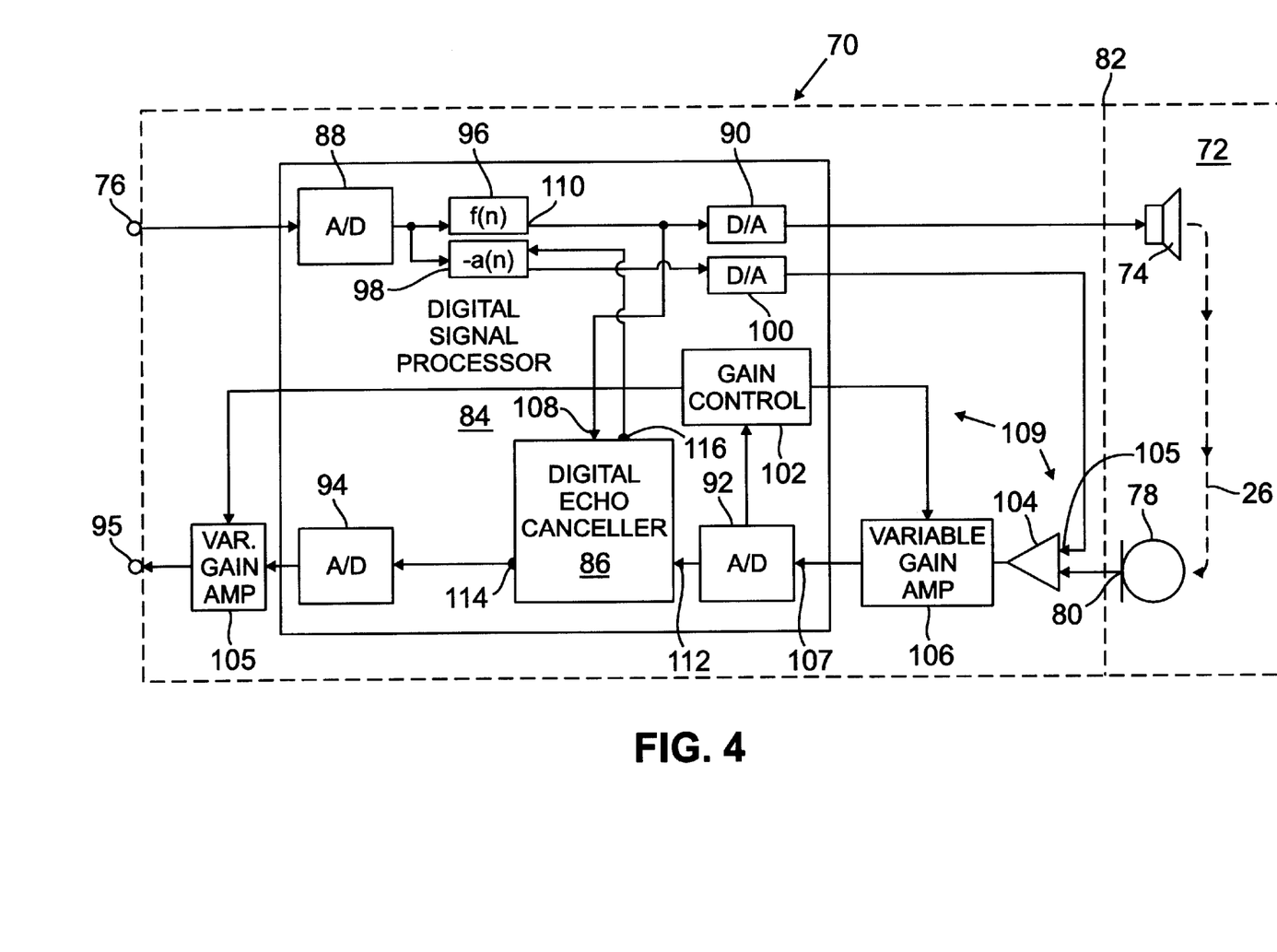
FIG. 4 is a functional block diagram of the preferred embodiment of the echo canceller of the present invention as employed to cancel acoustic cross coupling echo components in a telephone.

Referring to FIG. 4, an echo canceller 70 of the present invention is employed with a telephone 72 having a speaker 74 for producing sounds corresponding to an incoming received signal at an input terminal 76 and a microphone 78 for converting sounds to an analog output signal on its output 80. The telephone 72 is a regular telephone, a telephonic hand set, a speaker telephone or stand alone speaker-microphone set, a cordless telephone, a cellular telephone or a fill duplex two way radio and has additional conventional components which have not been shown for purposes of simplicity. The echo canceller 70 and telephone 72 are contained within a common housing 82.

The echo canceller 70 includes a digital signal processor 84. The digital signal processor includes a digital echo canceller 86 and an input A/D converter 88, an output D/A converter 90, an input A/D converter 92 and an output D/A converter 94 producing an echo reduced analog output signal on a terminal 95. The digital signal processor 84 is preferably a DSP 1604 digital signal processor made by the Microelectronics Division of Lucent Technologies Inc. These four conversion components 88, 90, 92 and 94 and the digital echo canceller 86 are substantially the same as the corresponding components of the prior art digital echo canceller of FIG. 2.

The novel components of the digital echo canceller 70 which are lacking in prior art devices and enable obtainment of the advantages of the invention are digital filter components 96 and 98, another D/A converter 100 for converting the output signal from filter component 98 and a gain control component 102, all included within the digital signal processor 84, and a summing amplifier, or summing node, 104 and a variable gain input amplifier 106 and a variable gain output amplifier which are discrete from the digital signal processor 84 and alternatively integral with the digital signal processor 84.

The digital echo canceller 86 digitally processes the analog output signal from microphone 78 and variable gain amplifier 106 after it is converted to digital form by the A/D converter 92 to digitally reduce the residual cross coupling echo component before transmission from the digital echo canceller 86 by D/A converter 94 and variable gain amplifier 105. However, the summing node 104 and variable gain amplifier 106 of an analog echo canceller 109 are connected between the microphone output 80 and the digital echo canceller 86 for analog reduction of the cross coupling echo component in the analog output signal appearing on output 80 when in analog form before digital processing by the digital echo canceller 86.

The filter component 98 digitally filters the incoming signal from the A/D converter 88 to generate a digital cancellation signal which is converted to an analog cancellation signal by D/A converter 100 which is substantially the same as the acoustic cross coupling echo component in the analog output signal at output 80. The analog cancellation signal is the negative of the echo component and summing amplifier 104 combines by summing the analog echo cancellation signal at an input 105 with the analog output signal from microphone output terminal 80 to reduce the cross coupling echo component 26 before digital processing by the digital echo canceller 86.

After the echo component has been reduced, the gain control component 102 of the digital signal processor 84 controls the variable gain amplifier 106 to automatically amplify the echo reduced analog output signal at the output of summing amplifier 104 to a level for substantially maximum resolution digitization of the echo reduced microphonic analog output signal on output terminal 80. The gain control component 102 automatically controls the variable gain amplifier 105 to compensate for changes in gain of amplifier 106 to maintain a uniform gain through the system. This improved resolution also enhances operation of the digital echo canceller 86 in digitally removing any residual echo component remaining after analog cancellation for there are more bits available for digitization and improved resolution of the residual echo components.

In order to make the analog cancellation signal to be the same as the cross coupling echo component, it is necessary to digitally process the signals with the digital filter components 96 and 98. The cross coupling path from D/A converter 90, speaker 74 and microphone 78 to the output 112 of A/D converter 92 has a scaled digital impulse response represented by a(n) while the feedback path of the analog cancellation signal from D/A converter 100, summing amplifier 104 to the output 112 of A/D converter 92 also has a scaled impulse response represented by the function f(n).

The impulse responses are determined in each path by well known methods, such as the impulse generation, or empirical method or computed by the normalized least mean squares method. For information concerning the determination of impulse responses, the reader is referred to U.S. Pat. No. 5,598,468, the disclosure of which is incorporated by reference.

After the impulse response f(n) and a(n) for each path is determined, then the signal on each path is preprocessed within the digital signal processor 84 by the impulse response of the opposite path. The digital signal from the A/D converter 88 to the speaker 74 is preprocessed by the digital filter 96 with the impulse response f(n) of the feedback path, and the digital signal of the feedback path is preprocessed with the negative of the impulse response a(n) of the cross coupling path.

As a result of this preprocessing by digital filters 96 and 98, the input to A/D converter 92 via the cross coupling speaker path is f(n)*a(n) (where * is the convolution operator) and the input to A/D converter 92 via the feedback path is a(n)*f(n). Since the order of convolution is not important, i.e. f(n)*a(n)=a(n)*f(n), the contribution of energy from the analog cancellation signal at input 105 of summing amplifier 104 is equal but opposite to the cross coupling component of input 80 of the summing amplifier from the output 80 of microphone 78 and inputted to the summing amplifier 104. Accordingly, the cross coupling component at the output of the summing amplifier will be zero, in theory, within the length of the digital filters 96 and 98.

The f(n) and a(n) impulse responses are the digital-to-digital impulse responses from the of the D/A converters 100 and 90, respectively, outputs to the digital output at A/D converter 92. Since the circuitry between the output of summing node 104 and the analog input of A/D converter 92 is the same for both paths, changes in the gain between the output of summing node 104 and the analog input of A/D converter 92 do not change the frequency response there between by any factor other than a gain factor. The f(n) impulse response provided by digital filter component 96 is scaled to have a nominal gain of 1.0. Accordingly, when the output signal to the speaker 74 is preprocessed by filter 96, there is little change in the gain of the signal path to the speaker 74. Both the cross coupling path and the feedback path are scaled by the same factor. The value of f(n) can easily be computed while the system is idle because no sounds are needed for the computation. For example in FIG. 4 an impulse can be generated on codec 100 and the response measured at codec 92 while a value of zero is generated on codec 90 and codec 95. During this time the local user will hear nothing on the speaker via codec 90 and no signal will be transmitted on the line via codec 95; as a result the impulse response can be computed from codec 100 to codec 92 and the user will hear nothing and perceive that the system is idle.

The digital echo canceller 86 includes at least one fill band echo canceller. In the case of a full band echo canceller, the digital echo canceller 86 has a state variable input 108 which receives the signal from the output 110 of digital filter 96 and the echo reduced digital output signal at an input 112 from A/D converter 92. The digitally echo reduced output signal from the digital echo canceller 86 is produced on an output terminal 114, and a coefficient update signal is produced on an output terminal 116 and passed to the digital filter 98 to train it.

The gain control component 102 first sets the gain of amplifier 106 at a level below digital saturation of A/D converter 92. The analog echo canceller digital filter 98 is then trained until substantially maximum echo reduction is achieved. After substantially maximum echo reduction is achieved and training is completed, the gain of the variable gain amplifier 106 is increased to obtain substantially maximum digital resolution during conversion. The gain control component 102 monitors the maximum magnitude of the echo reduced analog output signal relative to a peak conversion level of A/D converter 92. It then automatically adjusts the gain to maintain a preselected rate of repetitive conversions substantially at the peak conversion level.

Figure 7:
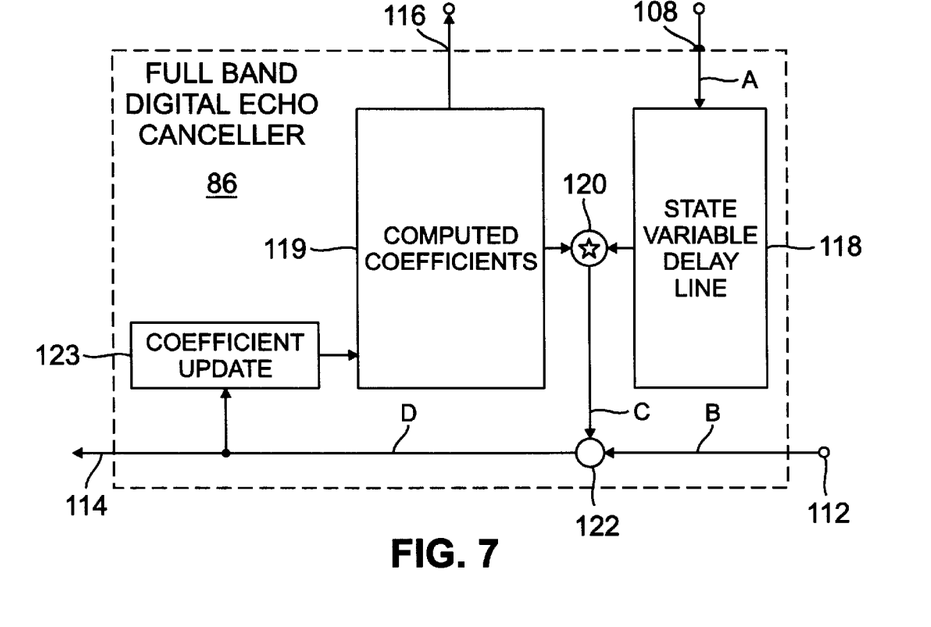
FIG. 7 is a functional block diagram illustrating the convolution of state variables with computed coefficients to update coefficients during digital preprocessing of the analog echo cancellation signal in FIGS. 4, 5 and 6.

Referring to FIG. 7, the signal at input 108 from digital filter 96 is stored to a state variable delay line 118. The digital input B signal from output terminal 112 of A/D converter 92 is from the microphone 78. The state variables in state variable delay line 118 are convoluted by a convolution operator 120 with the computed coefficients 119 to form a convoluted signal C. An error signal D is computed as D=B−C at a summing component 122 of the digital signal processor 84. The error signal D is used by a coefficient update component 123 to update the computed coefficients 119 using the normalized LMS algorithm: $W(n+1)=W(n)+\mu DX(n)/e(n)^2$, where W(n) is the coefficient vector at time "n" and W(n+1) is the coefficient vector after update to be used at time "n+1"; the value $\mu$ is the correction factor which has a typical value of 0.01; the X(n) vector is the state variable vector at time "n" and e(n) is the estimated scaler energy value at time "n" for the signal A at terminal 108. The computed coefficients 19 of the feedback digital echo canceller 86 of FIG. 7 and the scaled impulse response a(n) can be interchanged once the gain of the variable gain amplifier 106 has been adjusted by the gain control component 102. This gives an algorithm to update the impulse response a(n) of filter 98 from the full band echo canceller 86.

As the value of the scaled impulse response a(n) of filter 98 value locks in, the gain control component 102 automatically increasing the gain of variable gain amplifier 106 to enable a larger range of the A/D converter 92 to be used to digitize the echo reduced analog output signal at its input 107.

Figure 6:
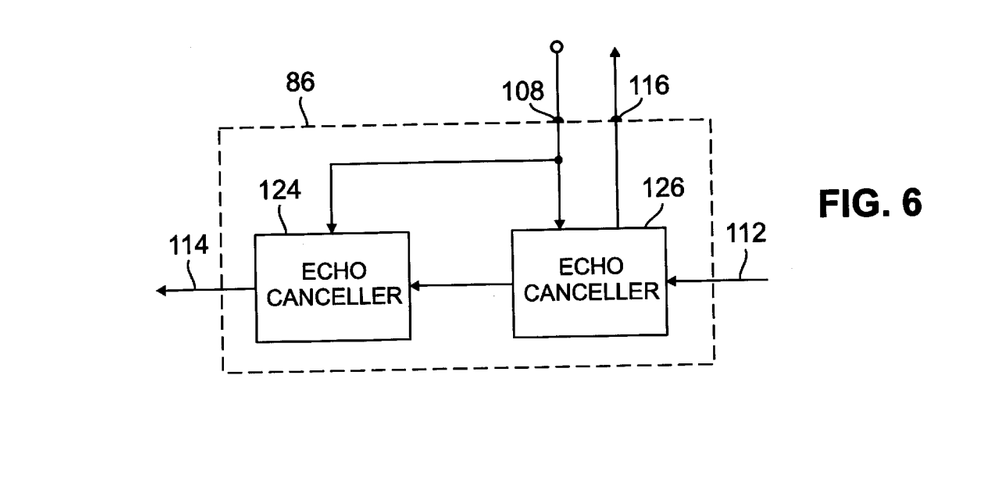
FIG. 6 is a functional block diagram of a preferred embodiment of the digital echo canceller block of FIGS. 4 and 5.

Preferably, the digital echo canceller 86 of FIG. 4 is composed of one full band echo canceller 126 and one subband echo canceller 124 as shown in FIG. 6 which work in cooperation with each other as described below with reference to FIGS. 9A and 9B.

The full band echo canceller is used during the analog echo canceller training period because the coefficients can be moved from the full band echo canceller 126 to the analog canceller digital filer −a(n)98 with only a gain change in the coefficients. A user skilled in the art will note that it should be possible to convert the subband coefficients to fill band coefficients to be used in the analog canceller digital filter −a(n) 98; but the simplicity of moving the coefficients from the fill band canceller 126 has reduced the motivation to do the math.

Once the analog canceller has trained the fill band canceller is turned off by simply passing data through the full band canceller 126 to the subband canceller 124. Once the analog canceller has trained the subband canceller is preferred because of its much improved performance over a typical fill band canceller.

Figure 8:
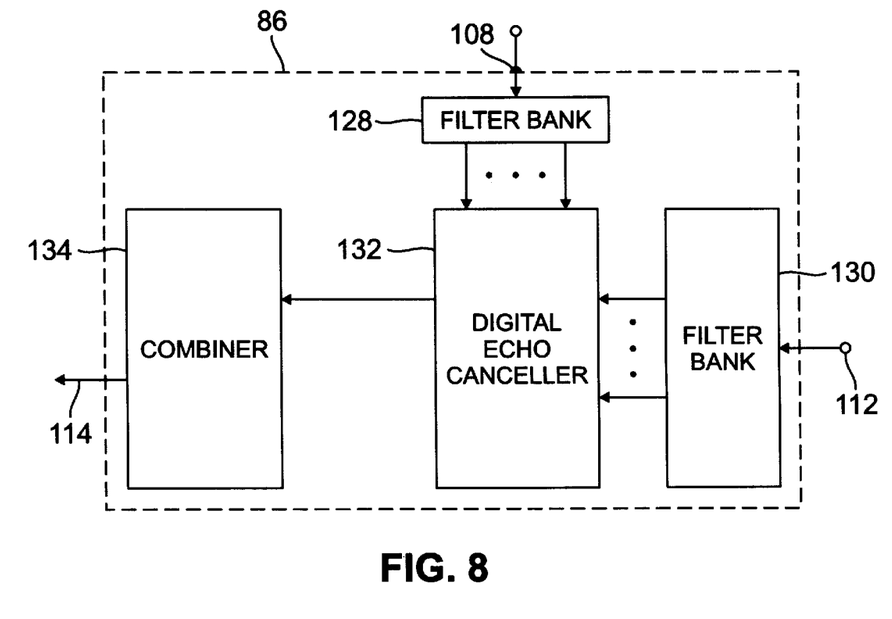
FIG. 8 is a functional block diagram of another embodiment of the digital echo canceller block of FIGS. 4 and 5, including subband echo cancellation and FIG. 6 includes a full band echo cancelling algorithm performed on each band.

Alternatively, referring to FIG. 8, the digital echo canceller 86 is composed of a filter bank which splits the incoming signals at input terminals 108 and 112 into a plurality of bands with filter banks 128 and 130. A fill band echo cancelling program is performed on each band by a digital echo canceller component 132. The echo cancelled signals of the plurality of frequency bands produced by the digital echo canceller 132 are combined by a combiner block 134 to produce the full signal at output terminal 114.

Because the microphone 78 and speaker 74 are in close proximity the gain of variable gain amplifier 106 cannot be increased until the digital filter 98 of analog echo canceller is trained, as noted above. When operation begins the gain of the variable gain amplifier 106 must be set such that the amplifier output signal applied to the input 107 of the A/D converter 92 does not saturate the A/D converter 92. As the analog canceller filter 96 becomes trained, and a large part of the echo component in the analog domain is reduced, the gain of the variable gain is automatically increased by gain control component such that the originating signal of the local talkers' voice is digitized with greater precision, as a result of improved resolution. In addition, the residual echo signal remaining in the analog output signal after the analog cancellation is also digitized with greater precision.

During training, the gain control component 102 first sets the gain of amplifier 106 to a level below digitization saturation level and then the analog echo canceller filter 98 until substantially maximum echo reduction is achieved. The gain of the variable gain amplifier 106 is then automatically increased to obtain maximum digital resolution during conversion by the A/D converter 106. The gain control component 102 monitors the maximum magnitude of the echo reduced analog output signal relative to a peak conversion level. It then automatically adjusts the gain to maintain a preselected rate of repetitive conversions substantially at the peak conversion level.

Figure 5:
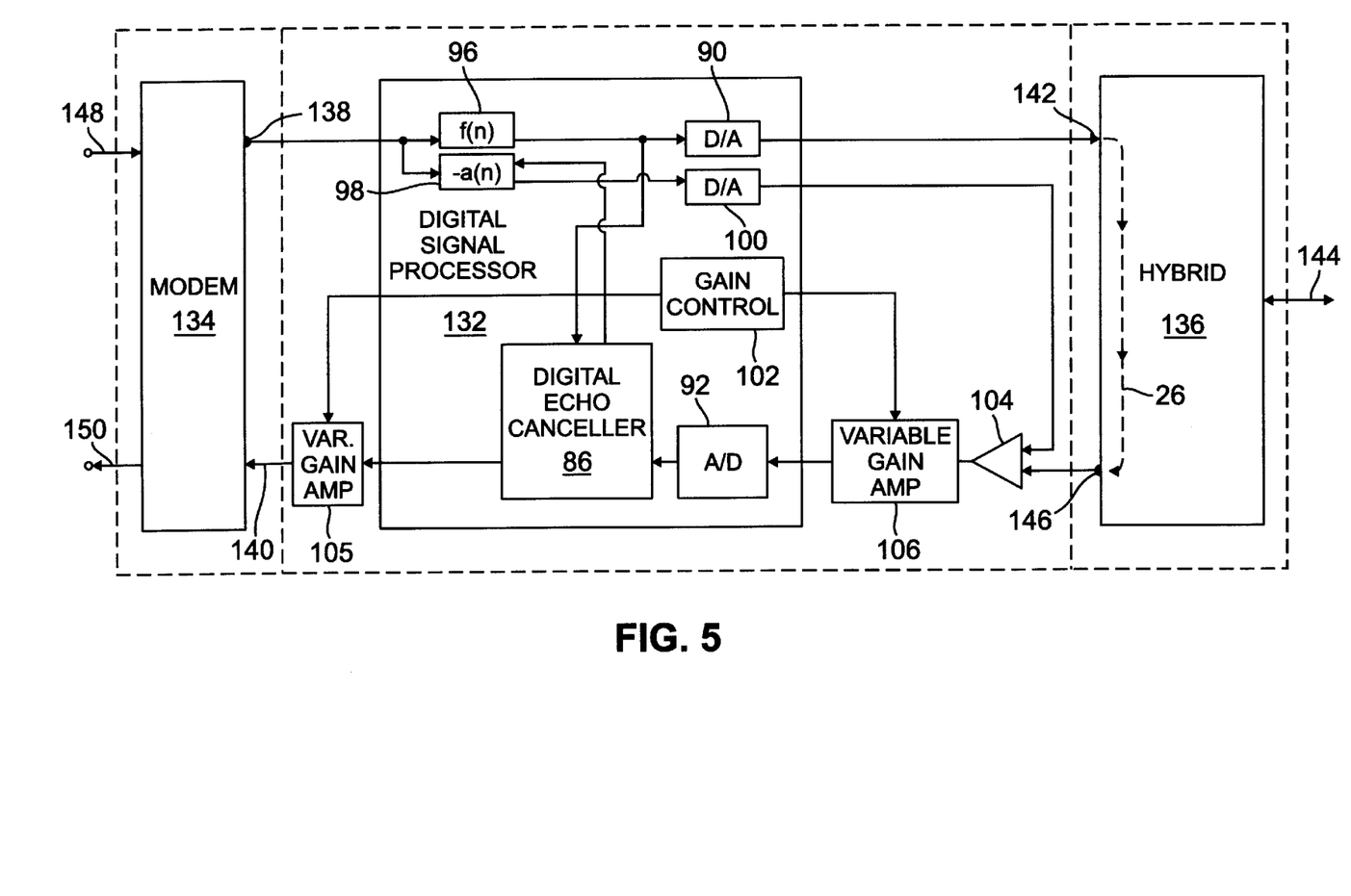
FIG. 5 is a functional block diagram of the preferred embodiment of the echo canceller of the present invention as employed to cancel cross coupling echo components in a hybrid associated with a modem.

Referring to FIG. 5, the preferred embodiment of the echo canceller 132 is shown as used in conjunction with a modem 134 with a telephonic hybrid interface circuit, or hybrid, 136. The digital signal processor 132 and all its components are the same as the digital signal processor 84 of FIG. 4 as are also the same as the D/A converter 90, D/A converter 100, summing node 104 and variable gain amplifier 106 and variable gain amplifier 105. The principal difference is that because the modem, corresponding to the communication unit 12 of FIG. 1 transmits signals on its output 138 and receives signal at its input 140 in digital form, the input A/D converter 88 and the output D/A converter 94 have been eliminated and the incoming analog received signal from output terminal 138 of modem 134 is passed directly to the digital filters 96 and 98 and the output 114 of the digital echo canceller 86 is passed directly to input 140 of modem 134.

The hybrid 136 receives an analog signal from D/A converter 90 at one input terminal 142 and couples it to its single pair telephone line output 144. The digital data is modulated to form the received analog signal at input terminal 142 while received digital data at a modem input terminal 148 is modulated by the modem 134 into the audio band. Modulated data received on the telephone line 144 from a remote modem (not shown) is demodulated to form the digital output data at terminal 150. Signals received on the line 144 are coupled to an output terminal 146. Cross coupling of signals from input terminal 142 to output terminal 146 results in an echo component appearing on output 146 together with the originating signal received on telephone line 144 as described above with respect to FIG. 3.

Due to the cross coupling echo component received at A/D converter 92, the signal received from the remote modem is digitized with relatively fewer bits than if the echo component were reduced in the analog domain. However, with the analog cancellation signal applied to the summing node 104 in accordance with the present invention, a large part of the cross coupled modem echo signal is removed in the analog domain. As a result the gain of variable gain amplifier 106 is automatically increased, and the signal from the remote modem on line 144 is digitized with more bits. This results in an improved signal-to-noise ratio in the digital domain.

Another problem solved by the present invention results from the case when the communication unit is moved to a new location. The previously determined analog echo canceller coefficients may no longer be correct. In accordance with the invention, in that event means are provided to automatically return to a training mode to retrain the analog echo canceller filter 98 to adjust to changes caused by changes in the cross coupling path.

Figure 9A:
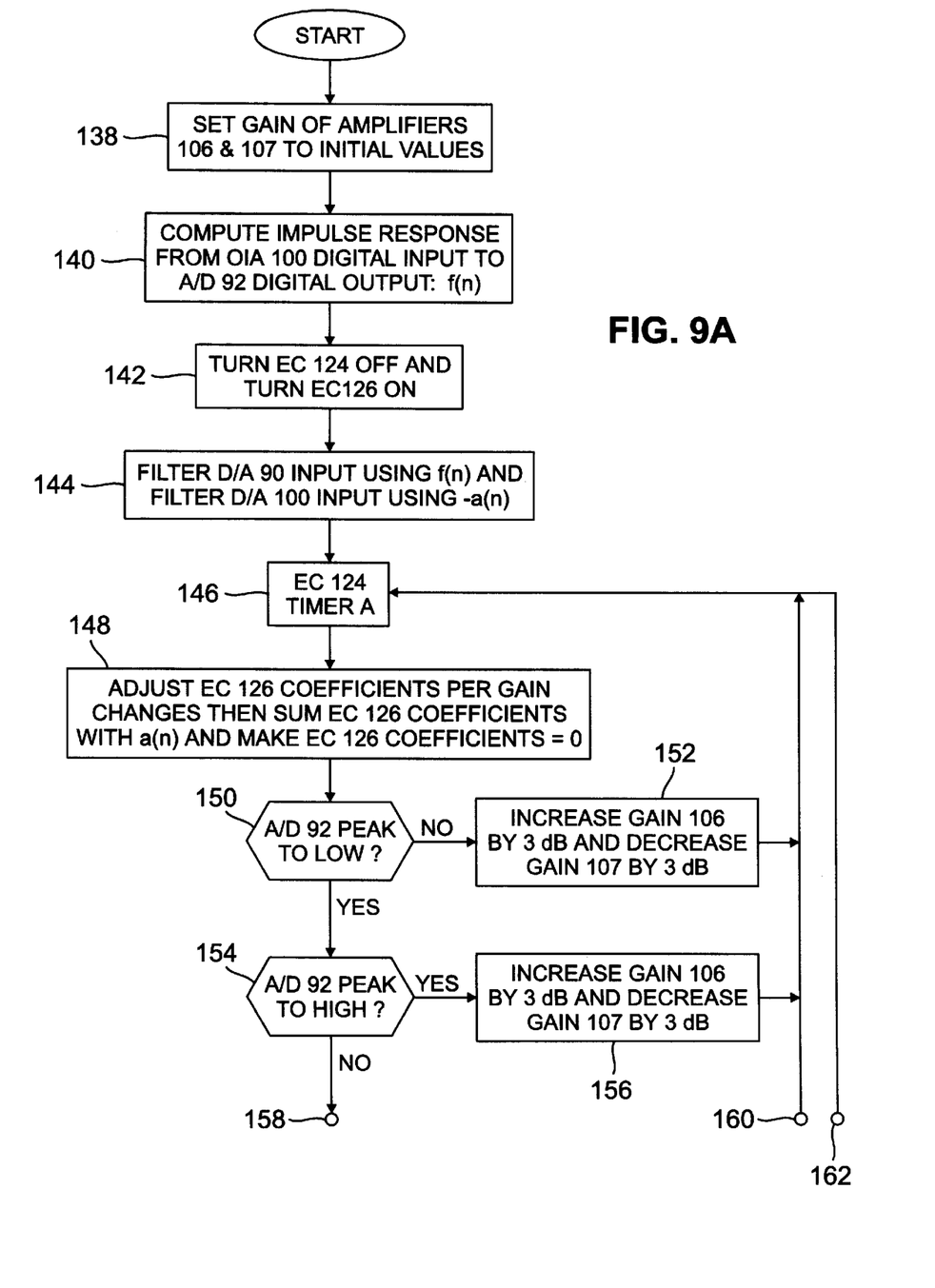
FIGS. 9A and 9B form a composite flow chart of the digital processing method employed to operate the echo canceller of FIGS. 4–6.
Figure 9B:
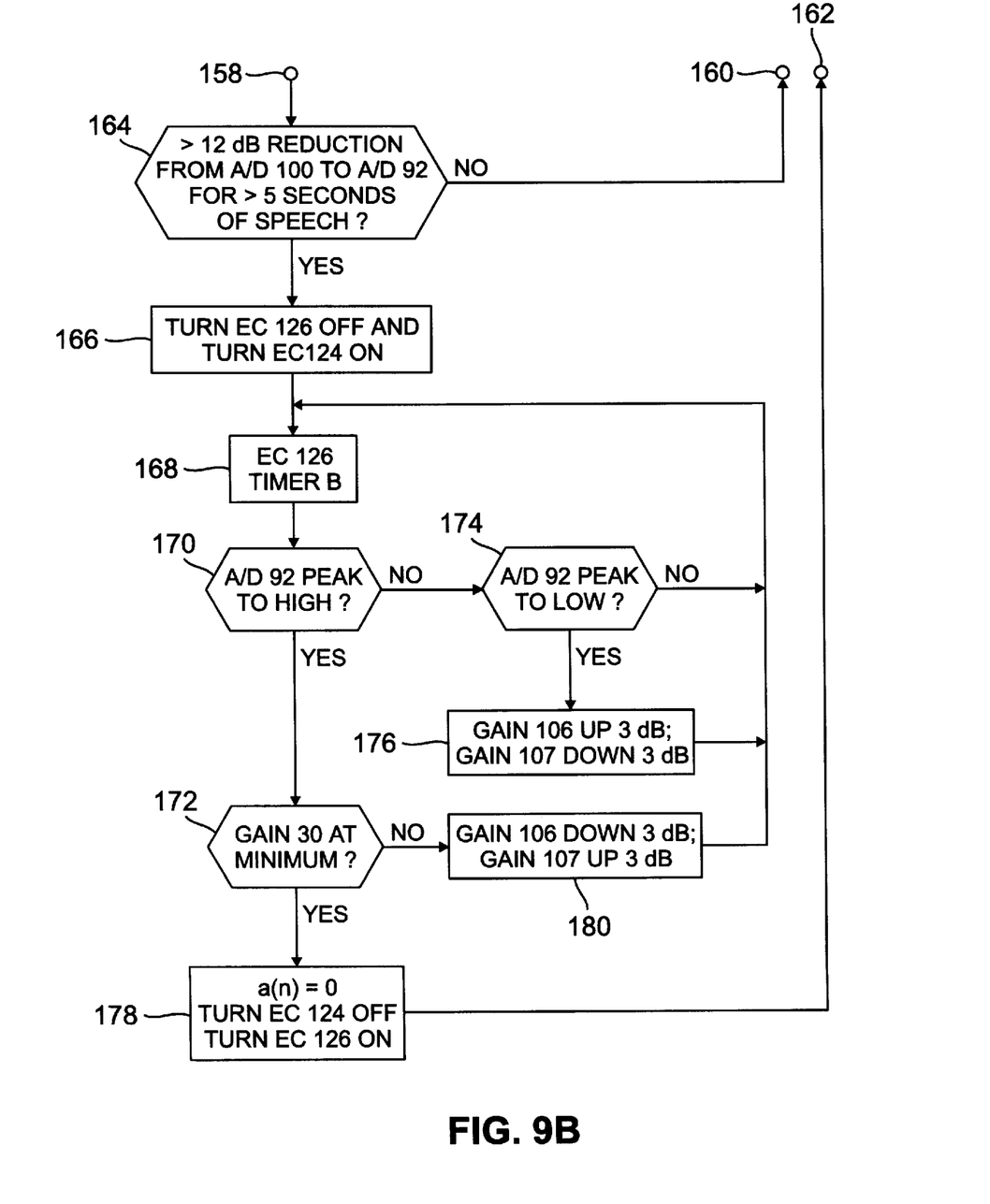

Referring now to FIGS. 9A and 9B, the operation of the echo canceller of FIG. 4 when employing the digital echo canceller 86 of FIG. 6 is described. After start of the software program for the digital signal processor in step 136, in step 138 the gain of the variable gain amplifier 106 and the gain of the variable gain amplifier 105 are set to preselected initial values. The gain of amplifier 106 is set sufficiently low to preclude saturation of the A/D converter 92. The gains of amplifiers 106 and 105 are later charged together in inverse proportion so the product of the two gains remains the same and a uniform output level is maintained. Next, in step 140, the impulse response f(n) for the feed back signal path from D/A converter 100 to A/D converter 92 is computed.

Since the feedback path from the output of D/A converter 100 to the input of the A/D converter 92 does not involve any transducers, this path can be trained at any time the system is idle. Preferably, this path is initially trained with 256 impulses, with an impulse being generated for every 64 samples. The input signal at A/D converter 92 which results from the impulse output signal from D/A converter 100 are all divided by 256 impulses and then summed to create f(n) which is 64 samples long and may be of a different length depending on the specific application. An initial short preliminary training period is first performed to enable a user to use the communication unit right out of the box. After the system is idle for one hour, i.e. on-hook in a telephone application, the system will completely train the feedback path with 65536 impulses with 64 samples between impulses. Even with 256 impulses and someone talking in the room such that the microphonic output is also part of the computed impulse response for f(n), the f(n) value is still very usable. With 65536 samples, even with someone talking in the room in the case of a speaker telephone, during computation, there is little difference detected in the f(n) values as compared to when computed with the room being silent.

In keeping with one aspect of the invention, if use of the product is commenced during the 65536 impulse complete training period, then the training period is suspended, and the original 256 sample impulse response from the preliminary training is used.

Also, the impulse output need not have a magnitude of one, but it is important that the magnitude of the frequency response across the speech band be as close to one as possible. If the magnitude of the frequency response is not one across the band, because the signal received by the speaker is filtered with f(n) by filter 96, the magnitude of the speaker output will be effected.

In step 142, echo canceller 126 is turned on to train the analog echo canceller filter 98 and the other echo canceller 124 is turned off. Echo canceller 124 is used as a classic digital echo canceller as described in U.S. Pat. No. 5,598, 468, previously incorporated by reference herein. Echo canceller 126 is a full band echo canceller, and the echo canceller 124 is preferably a subband band echo canceller. When one of the echo cancellers 124 and 126 is turned off data is simply passed through the off echo canceller without alteration.

Referring to FIG. 4, it is important to note that the echo canceller 126 uses the data after filtering by filter 96 and before conversion by D/A converter 90. As a result data from the echo canceller 126 is the residual of the value of a(n). The coefficients of the echo canceller 126 are multiplied by a scale factor and added to the current value of a(n) in filter 98, and the coefficients of the echo canceller 126 are set to zero. The output of echo canceller 126 will have the same response after the coefficients are moved as it did before the coefficients of the echo canceller 126 are moved to the digital filter 98 and the coefficients of the echo canceller 126 are set to zero. However, the system will have a slightly different response for the length of the digital filter 96 because some samples are in transit and not cancelled by the echo canceller 126 when the coefficients are set to zero. Consequently, there is a negligible transient period.

In step 144, the input signal to the D/A converter 90 is filtered by digital filter 96 with impulse response f(n), and the input signal to the D/A converter 100 is filtered by digital filter 98 with impulse response −a(n). When this process starts in step 136, the coefficients of impulse response a(n) are all zero so the output of D/A converter 100 is all zeros. Accordingly, at the start, the system operates as if the analog echo canceller were not present, and the system looks like a conventional digital echo canceller using a fill band echo cancelling algorithm.

In step 146, a timer A (not shown) associated with echo canceller 124 is started. During a preselected time period, such as one second, the peak input to A/D converter 192 is monitored, and if the peak value received is some factor less than the full range of the A/D converter 192, then the gain of valuable gain amplifier 106 is increased to enable use of a larger range of the A/D converter 192.

In the preferred embodiment of FIG. 4, the timer will only detect the peak for a one second period of data if the input is greater than the noise floor +20% or 0×0080 which ever is greater. Different noise floor values will very likely be needed for different systems.

The noise floor is computed in the digital signal processor 84, as follows:

```
/************************************************************/
/*"C" code for noise floor computation.
/*This routine is only called once per sample; at 8000 kH2 sample rate.
/************************************************************/
#defineNOISE_ATTACK    exp(-1.0/(10.0*8000.0))    /*10 second attack time.*/
#defineNOISE_ATTACK    exp(-1.0/(0.001*8000.0))   /*0.001 second decay time.*/
float current_noise_floor; // Noise floor computation result.
void noise_floor(float data_input)
{
    if(fabs(data_input)>current_noise_floor)
    {
        //Use the Attack coefficient.
        current_noise_floor=current_noise_floor*NOISE_ATTACK
                    + fabs(data_input)*(1.0-NOISE_ATTACK);
    }
    else
    {
        //Use the Decay coefficient.
        current_noise_floor=current_noise_floor*NOISE_DECAY
                    + fabs(data_input)*(1.0-NOISE_DECAY);
    }
    // 0 × 0080 expressed as a Q14 value = 0.0078125
    current_noise_floor=max(current_noise_floor,0.0078125);
}
/************************************************************/
/*"C" code for EC 124 Timer computation. If Timer has not expired the return value is 0.0. If Timer A
/*has expired the return value is non-zero.
/************************************************************/
unsigned int Timer_count=0;
unsigned int Timer_count-saturated=0;
float Timer_peak=0.0;
float Timer A (float data_input)
{
        float temp;
        noise_floor(data_input);// Compute the current noise floor.
        if(fabs(data_input)>current_noise_floor*1.20){
                if(fabs(data_input)>Timer_peak)Timer_peak=fabs
(timer_input);
            ++ Timer_count;
        }
        // Test to see if the two's complement 16 bit codec has saturated.
        if( (int) data_input==0 × 7FFF 11(int)data_input==0 × 8000)}
        ++ Timer_count_saturated.
        Timer_peak = 0 × 7FFF;
        }
        if (Timer_count>8000 11 Timer_count_saturated>10)
        {
            temp=Timer_peak;
            Timer_peak=0.0;
            Timer_count=0;
            Timer_count_saturated=0;
            return(temp);
        }
    else
    {
        return(0.0);
    }
}
/************************************************************/
```

With an 8 kHz sampling rate, there should be one second or eight thousand samples of data above the noise floor at the digital output of A/D converter 92. If more than ten saturated samples are found before the 8000 samples are found, then the echo canceller 124 timer A will timeout immediately. There is no timeout on one saturated sample to avoid automatic adjustment of the gain due to loud transients such as a door slamming.

In step 148, the coefficients of the echo canceller 126 are changed in accordance with any changes in gain and are summed with the coefficients of the impulse response −a(n) of the digital filter 98, and then the coefficients of the echo canceller 126 are set to zero. It is important to note that if the impulse response f(n) of filter 96 and the impulse response −a(n) of digital filter 98 have converged to optimum values, then the gain of valuable gain amplifier 106 can be changed without necessitating changes to f(n) or −a(n). However, as the system is training and the gain is changing, a condition results in which f(n) was trained with the gain set to one particular level and the impulse response −a(n) of digital filter 96 is being trained with the gain set to a different value. Consequently, before the echo canceller 126 coefficients can be moved to the impulse response a(n) of filter 98, the coefficients must be adjusted in accordance with any changes made to the gain of amplifier 106. For example, if the gain has been increased by 3 dB since f(n) of filter 96 was trained, then the coefficients of the echo canceller 126 must be reduced by 3 dB before the coefficients can be added to impulse response a(n) of filter 98.

The coefficients also need to be adjusted according to the size of the impulse used to train the feedback path. For example, if an impulse of magnitude 0.37 to the feedback path gives a nominal frequency response of 1.0 for the feedback path then the echo canceller coefficients need to also be multiplied by 0.37 because the same magnitude of impulse response needs to be used for the feedback path and the cross coupling path.

In step 150, a determination is made of whether the peak value of the output of the A/D converter 92 is too low. If after 8000 samples the peak of the signal is more than 12 dB from the maximum peak, or saturation, value of the A/D converter 92, then in step 152 the gain of amplifier 106 will be increased by 3 dB and the gain of amplifier 105 will be decreased by 3 dB to use a larger portion of the full range of the A/D converter 92. The gain must be found too low for three consecutive frames of the 8000 samples before the gain will be adjusted.

In step 154, a determination is made as to whether the peak signal applied to the A/D converter is too high. If the peak digital value at A/D converter 92 is too high, then in step 156 the gain of amplifier 106 is reduced so that there will be a reasonable amount of headroom at the A/D converter 92. The gain must be found too high for three consecutive periods of the echo canceller 124 timer before the gain will be adjusted. If the A/D converter is truly saturating due to a continuous signal that is too strong, then the timer of echo canceller 124 will time out quickly and relatively quick adjustment of the gain will be made.

Turning now to FIG. 9B, in which the terminal points 158, 160 and 162 connect with the terminal points of the same reference numbers in FIG. 9A, in step 164 a determination is made as to whether there has been more than a twelve decibel reduction from A/D converter 90 to A/D converter 92.

If the decibel reduction is greater than 12 dB for two timer periods of echo canceller 124, then the echo canceller 126 is turned off, and the echo canceller 124 is started. This will freeze the analog echo canceller until saturation occurs as may result due to the system being moved or something being moved near the system.

The signal level at the digital input of the A/D converter 90 is measured as follows in which Codec 20=D/A converter 90 and Codec 18=A/D converter 92:

```
/*******************************************************************/
/*Measure the signal level at Codec 20.
/*******************************************************************/
#define CODE20_ATTACK      exp(-1.0/(0.050*8000.0))   //50 millisecond attack time.
#define CODE20_DECAY       exp(-1.0/(0.025*8000.0))   //25 millisecond decay time.
float Codec20Level=0.0;
codec20Sig(float data_in)//"data_in" is the digital data output to codec 20.
{
    if(fabs(data_in)>current_noise_floor*1.3)
    {
        if(fabs(data_n)>Codec20Level) {
            Codec20Level=Codec20Level*CODEC20_ATTACK
                +fabs(data_input)*(1.0-CODEC20_ATTACK);
        }
        else
        {
            Codec20Level=Codec20Level*CODE20_DECAY
                +fabs(data_input)*(1.0-CODEC20_DECAY);
        }
    {
}
/*******************************************************************/
And the digital output at codec 18 is measured as:
/*******************************************************************/
/*Measure the signal level at Codec 18.
/*For codec 18 we do not require that the "data in" be above some level of the "current_noise_floor"
/*because the analog canceller can work so well that the codec 18 input may not make it above the
/*noise floor.
/*******************************************************************/
#define NOISE_ATTACK       exp(-1.0/(10.0*8000.0))    //10 second attack time.
#define CODEC18_ATTACK     exp(-1.0/(0.050*8000.0))   //50 millisecond attack time.
#define CODEC18_DECAY      exp(-1.0/(0.025*8000.0))   //25 millisecond decay time.
float Codec18Level=0.0;
codec18Sig(float data_in)//"data_in" is the digital data output to codec 18.
{
        if(fabs(data_in)>Codec18Level){
            Codec18Level=Codec18Level*CODEC18_ATTACK
```

-continued

```
            +fabs(data_input)*(1.0-CODEC18_ATTACK);
        }
        else
        {
            Codec18Level=Codec18Level*CODE18_DECAY
                +fabs(data_input)*(1.0-CODEC18_DECAY);
        }
}
/**************************************************************************/
To determine the analog canceller is trained:
{
    if(Code18Level<Codec20Level/4.0       /*12 dB */
        && Codec20Level>current_noise_floor*1.20)
    {
        if(++CodecConsecutive==2)
            //the analog canceller is considered trained.
    }
    else
        CodecConsecutive=0; //restart the consecutive frame counter.
}
Values such as the 12dB setting will very likely be different for different systems.
```

In step 166, the echo canceller 126 is turned off and the echo canceller 124 is turned on. At this point, the analog echo canceller is considered trained, so the full band echo canceller 126 is turned off and the second echo canceller 124 is turned on.

Next, in step 168, a timer B associated with echo canceller 126 is started. This timer is similar to the timer A of echo canceller 124 started in step 146 except the periods are longer because in this case the system should respond only to major changes in the echo path which cause the A/D converter 92 to saturate. During a preselected timer period, the peak input to A/D converter 92 is monitored, and if the peak value is some factor less than the full range of the A/D converter 92, the gain of amplifier 106 is increased to enable a larger range of the A/D converter 92 to be used. The gain can be changed with no effect on the impulse response f(n) of filter 96 and the impulse response −a(n) of filter 98. However, if the gain is changed, then the coefficients in the echo canceller 124 must be adjusted accordingly. After the analog canceller has been trained, it is desirable to keep attempts to change the gain to a minimum.

The timer B of step 168 will only detect the peak for every ten seconds of data where the input is greater than the noise floor plus 20% or 0x0080 whichever is greater. The noise floor is computed in the same way as computed for the timer A of echo canceller 126 described above. With an 8 kHz sampling rate, in ten seconds 80,000 samples of data above the noise floor at digital output of A/D converter 92. If ten saturated samples are found before the 80,000 samples of data above the noise floor are found, then the timer in step 168 will timeout immediately.

In step 170, a determination is made as to whether the peak signals at the input of A/D converter are too high. If the peak signals are found to be within 3 dB of the maximum conversion value for three consecutive periods of the timer of echo canceller 126, then the gain of amplifier 106 is reduced if it is not already at its minimum value as determined in step 172. Within the loop of step 168, if the gains are changed, then the coefficients of the echo canceller 124 are also changed by the multiplicative inverse, e.g. if the gain changes by a factor of 0.707 then the coefficients of the echo canceller 124 must change by the same factor. As in the timer of echo canceller 126, in step 146, if the A/D converter 92 is continuously saturating, then the timer of echo canceller 124 will time out quickly, and the gain setting will be fixed quickly.

If the peak is not too high, as determined in step 170, a determination is made in step 174 if the peak is too low. If for three consecutive timer periods the peak input is not within 12 dB of the peak conversion value of the A/D converter 92, then in step 176 the gains of amplifier 106 is changed to use more of the available range of the A/D converter 92.

As noted above, in step 172, a determination is made as to whether the gain of amplifier 106 is at minimum. If the codec range is at or near saturation, and the gain has already been reduced to its minimum value, then the algorithm assumes that the system has been moved and at this point the analog canceller needs to be retrained. In such event, the program proceeds to step 178 in which the coefficients of the impulse response −a(n) of filter 98 are set to zero, the echo canceller 124 is turned off and the echo canceller 126 is turned on. If the analog canceller needs to be retrained then the a(n) values will be set to zero, and the system will return to the timer loop of step 146, FIG. 9A, to retrain the analog echo canceller. If the peak is too high, but the gain is not already set to a minimum, then in step 180, the gain of amplifier 106 is reduced by 3 dB and the gain of the amplifier 105 is increased by 3 db.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. An echo canceller for reducing an echo component in an analog output signal, the echo canceller comprising:
    a digital echo canceller for digitally processing the analog output signal after being converted to digital form to reduce the echo component before transmission;
    an analog echo canceller for reducing the echo component in the analog output signal when in analog form before digital processing by the digital echo canceller; wherein the analog echo canceller includes:
        means for generating an analog cancellation signal which is substantially the same as the echo component in the analog output signal before digital processing by the digital echo canceller; and means for combining the analog echo cancellation signal with the analog output signal to reduce the echo component before digital processing by the digital echo canceller wherein the combining means produces an echo reduced analog output signal and includes means interposed between the combining means and the digital echo canceller to automatically amplify the echo reduced analog output signal to a level for substantially maximum resolution digitization of the echo reduced analog output signal;

wherein said automatically amplifying means includes:
a variable gain amplifier,
means for setting the amplifier gain at a level below a digitization saturation level,
means for training the analog echo canceller until substantially maximum echo reduction is achieved, and
means for increasing the gain of the variable gain amplifier after training is completed to obtain maximum digital resolution during conversion.

2. The echo canceller of claim 1 in which said combining means sums the analog cancellation signal plus the analog output signal to reduce the echo component before digital processing by the digital echo canceller.

3. An echo canceller for reducing an echo component in an analog output signal caused by cross coupling of an incoming received signal received at a communication unit with the analog output signal, the echo canceller comprising:

a digital echo canceller for digitally processing the analog output signal after being converted to digital form to reduce the cross coupling echo component before transmission from the communication unit;

an analog echo canceller connected between the communication unit output and the digital echo canceller for analog reduction of the cross coupling echo component in the analog output signal when in analog form before digital processing by the digital echo canceller, wherein the analog echo canceller includes:

means for generating an analog cancellation signal which is substantially the same as the acoustic coupling echo component in the analog output signal before digital processing by the digital echo canceller; and means for combining the analog echo cancellation signal with the analog output signal to reduce the cross coupling echo component before digital processing by the digital echo canceller, wherein the combining means produces an echo reduced analog output signal and includes means interposed between the combining means and the digital echo canceller to automatically amplify the echo reduced analog output signal to a level for substantially maximum resolution digitization of the echo reduced analog output signal;

wherein said automatically amplifying means includes:
a variable gain amplifier,
means for setting the amplifier gain at a level below a digitization saturation level,
means for training the analog echo canceller until substantially maximum echo reduction is achieved, and
means for increasing the gain of the variable gain amplifier after training is completed to obtain maximum digital resolution during conversion.

4. The echo canceller of claim 3 in which
said analog cancellation signal is the negative of the cross coupling echo component, and
said combining means sums the analog cancellation signal plus the analog output signal to reduce the acoustic coupling echo component before digital processing by the digital echo canceller.

5. The echo canceller of claim 3 in which the gain increasing means includes
means for monitoring the maximum magnitude of the echo reduced analog output signal relative to a peak conversion level, and
means for automatically adjusting the gain to maintain a preselected rate of repetitive conversions substantially at the peak conversion level.

6. The echo canceller of claim 3 in which said training means includes
means for determining whether retraining the analog echo canceller is required,
means responsive to the determining means for reducing the gain of the variable gain amplifier if retraining is required, and
means responsive to the determining means to retrain the analog echo canceller if retraining is required, and in which
said gain increasing means includes means for increasing the gain of the variable gain amplifier after retraining is concluded to obtain substantially maximum digital resolution during conversion after retraining.

7. The echo canceller of claim 3 in which said training means includes
means for providing preliminary training, and
means for providing complete training after preliminary training is concluded.

8. An echo canceller for reducing an echo component in an analog output signal caused by cross coupling of an incoming received signal received at a communication unit with the analog output signal, the echo canceller comprising:

a digital echo canceller for digitally processing the analog output signal after being converted to digital form to reduce the cross coupling echo component before transmission from the communication unit;

an analog echo canceller connected between the communication unit output and the digital echo canceller for analog reduction of the cross coupling echo component in the analog output signal when in analog form before digital processing by the digital echo canceller, wherein the analog echo canceller includes:

means for generating an analog cancellation signal which is substantially the same as the acoustic coupling echo component in the analog output signal before digital processing by the digital echo canceller, and means for combining the analog echo cancellation signal with the analog output signal to reduce the cross coupling echo component before digital processing by the digital echo canceller;

wherein the combining means produces an echo reduced analog output signal, and includes means interposed between the combining means and the digital echo canceller to automatically amplify the echo reduced analog output signal to a level for substantially maximum resolution digitization of the echo reduced analog output signal;

means for training the analog echo canceller until substantially maximum echo reduction is achieved;

another means for amplifying the echo reduced analog output signal at an output terminal of the digital echo canceller after both analog and digital reduction of the cross coupling echo component; and means for controlling the gain of the other amplifying means to compensate for changes in gain of the automatically amplifying means to maintain a substantially uniform total gain from both the other amplifying means and the automatically amplifying means.

9. The echo canceller of claim 8 in which said analog cancellation signal generating means includes means for converting the incoming received signal to a digital received signal, means for digitally processing the digital received signal to produce a digitally filtered received signal, and means for converting the digitally filtered received signal to the analog cancellation signal.

10. The echo canceller of claim 9 in which said digitally processing means includes means for digitally inverting the digital received signal.

11. The echo canceller of claim 9 in which the incoming received signal is coupled with the analog output signal via a cross coupling path having a scaled impulse response, and said digital processing means includes means for processing the digital received signal with the scaled impulse response of the cross coupling path.

12. The echo canceller of claim 11 in which the analog cancellation signal is coupled to the combining means via a feedback path having a scaled impulse response, and said digital processing means includes means for processing the digital received signal with the scaled impulse response of the feedback path.

13. The echo canceller of claim 9 in which the analog cancellation signal is coupled to the combining means via a feedback path having a scaled impulse response, and said digital processing means includes means for processing the digital received signal with the scaled impulse response of the feedback path.

14. The echo canceller of claim 9 including means for digitally processing the digital received signal to produce another digitally filtered received signal, and means for converting the other digitally filtered received signal to a filtered analog received signal.

15. The echo canceller of claim 8, in combination with the communication unit, and in which said communication unit is a telephone having a speaker for producing sounds corresponding to the incoming received signal and a microphone for converting sounds to the analog output signal, said analog output signal is a microphonic analog output signal for transmission to a remote telephone, said microphone is acoustically coupled with the speaker resulting in production of said echo component, and said echo component is an acoustic coupling echo component in the microphonic analog output signal.

16. The echo canceller of claim 8 in combination with the communication unit, and in which said communication unit is a telephonic modem unit with a modem and a hybrid circuit for interfacing the incoming received signal received from the modem at a hybrid input terminal to a single pair telephone line and for interfacing the analog output signal received on the single pair telephone line through a hybrid output terminal to the modem, and said hybrid circuit has components which cross couple the signals at the hybrid input terminal to the hybrid output terminal to cause echo components in the analog output signal at the hybrid output terminal.

17. An echo cancelling method for reducing an echo component in an analog output signal at a communication unit caused by cross coupling of an incoming received signal at the communication unit with the analog output signal, the method comprising the steps of:

reducing with an analog echo canceller the cross coupling echo component in the analog output signal to produce an echo reduced analog output signal, wherein the step of reducing with an analog echo canceller includes the steps of:

generating an analog cancellation signal which is substantially the same as the cross coupling echo component in the analog output signal before digital processing by a digital echo canceller; and combining the analog echo cancellation signal with the analog output signal to reduce the acoustic coupling echo component before digital processing by the digital echo canceller, wherein the step of combining results in production of the echo reduced analog output signal;

digitally processing the echo reduced analog output signal to reduce the acoustic coupling echo component before transmission; and automatically amplifying the echo reduced analog output signal to a level for substantially maximum resolution digitization of the echo reduced analog output signal with an amplifier interposed between combining means and the digital echo canceller, wherein said step of automatically amplifying the echo reduced analog output signal is performed with a variable gain amplifier, and includes the steps of:

setting the amplifier gain at a level below a digitization saturation level, training the analog echo canceller until substantially maximum echo reduction is achieved, and after training is completed, automatically increasing the gain of the amplifier to obtain substantially maximum digital resolution during conversion of the echo reduced analog output signal.

18. The echo cancelling method of claim 17 in which said analog cancellation signal is the negative of the acoustic coupling echo component, and said step of combining includes the step of summing the analog cancellation signal plus the microphonic analog output signal to reduce the acoustic coupling echo component before digital processing by the digital echo canceller.

19. The echo cancelling method of claim 17 in which said step of generating an analog cancellation signal includes the steps of converting the received signal to a digital received signal, digitally processing the digital received signal to produce a digitally filtered received signal, and converting the digitally filtered received signal to the analog cancellation signal.

20. The echo cancelling method of claim 19 in which said step of digitally processing includes the step of digitally inverting the digital received signal.

21. The echo cancelling method of claim 19 in which the incoming received signal is cross coupled with the analog output signal via a cross coupling path having a scaled impulse response, and said step of digital processing includes the step of processing the digital received signal with the scaled impulse response of the cross coupling path.

22. The echo cancelling method of claim 21 in which the analog cancellation signal is coupled to combining means via a feedback path having a scaled impulse response, and said step of digital processing includes a step of processing the digital received signal with the scaled impulse response of the feedback path.

23. The echo cancelling method of claim 19 in which the analog cancellation signal is coupled to combining means via a feedback path having a scaled impulse response, and said step of digital processing includes a step of processing the digital received signal with the scaled impulse response of the feedback path.

24. The echo cancelling method of claim 19 including the steps of digitally processing the digital received signal to produce another digitally filtered received signal, and converting the other digitally filtered received signal to a filtered analog received signal.

25. The echo cancelling method of claim 17 in which said training includes the steps of determining whether retraining the analog echo canceller is required, reducing the gain of the variable gain amplifier if retraining is required, and retraining the analog echo canceller if retraining is required, and increasing the gain of the variable gain amplifier after retraining is concluded to obtain substantially maximum digital resolution during conversion after retraining.

26. The echo cancelling method of claim 17 including the steps of providing preliminary training, and providing complete training after preliminary training is concluded.

27. The echo cancelling method of claim 17 including the steps of amplifying the echo reduced analog output signal at an output terminal of the digital echo canceller after both analog and digital reduction of the cross coupling echo component, and controlling the gain of other amplifying means to compensate for changes in gain of automatically amplifying means to maintain a substantially uniform total gain from both the other amplifying means and the automatically amplifying means.

28. The echo cancelling method of claim 17 including the steps of monitoring the maximum value of the echo reduced analog output signal relative to a peak conversion value, and automatically adjusting the gain to maintain a preselected rate of repetitive conversions at substantially the peak conversion value.

29. The echo cancelling method of claim 21 including the step of determining the scaled impulse response of a feedback path along which an analog cancellation signal is produced, determining the scaled impulse response of the cross coupling path, digitally processing signals along each one of said feedback and cross coupling paths with a scaled impulse response corresponding to an other one of the feedback and cross coupling paths.

30. The echo cancelling method of claim 17 in which said communication unit is a telephone having a speaker for producing sounds corresponding to the incoming received signal and a microphone for converting sounds to the analog output signal, said analog output signal is a microphonic analog output signal for transmission to a remote telephone, said microphone is acoustically coupled with the speaker resulting in production of said echo component, and said echo component is an acoustic coupling echo component in the analog output signal.

31. The echo cancelling method of claim 17 in which said communication unit is a telephonic modem unit with a modem and a hybrid circuit for interfacing the incoming received signal received from the modem at a hybrid input terminal to a single pair telephone line and for interfacing the analog output signal received on the single pair telephone line through a hybrid output terminal to the modem, and said hybrid circuit has components which cross couple the signals at the hybrid input terminal to the hybrid output terminal to cause echo components in the analog output signal at the hybrid output terminal.

* * * * *